(12) United States Patent
Krull et al.

(10) Patent No.: US 8,887,930 B1
(45) Date of Patent: Nov. 18, 2014

(54) ORGANIZATIONAL STORAGE SYSTEM

(76) Inventors: Mark A. Krull, New Braunfels, TX (US); Darrin M. Swagel, St. Louis Park, MN (US)

( * ) Notice: Subject to any disclaimer, the term of this patent is extended or adjusted under 35 U.S.C. 154(b) by 0 days.

(21) Appl. No.: 13/593,915

(22) Filed: Aug. 24, 2012

Related U.S. Application Data

(60) Provisional application No. 61/575,608, filed on Aug. 24, 2011.

(51) Int. Cl.
*A47B 73/00* (2006.01)

(52) U.S. Cl.
USPC .......................................... 211/77; 211/85.29

(58) Field of Classification Search
USPC ........ 211/60.1, 62, 63, 65, 66, 69, 69.1, 69.8, 211/70, 70.3, 70.6, 70.7, 74, 75, 76, 77, 78, 211/85.18, 95, 115, 129.1, 131.1, 144, 163; 108/94, 103, 139, 149; 141/165; 198/470.1, 478.1; 248/230.1, 230.7, 248/309.1, 312, 316.7; 312/125, 135, 305, 312/334.23; D6/322
See application file for complete search history.

(56) References Cited

U.S. PATENT DOCUMENTS

| | | | | |
|---|---|---|---|---|
| 551,459 A | * | 12/1895 | Walker et al. | 211/63 |
| 634,526 A | * | 10/1899 | Holmes | 211/63 |
| 898,153 A | * | 9/1908 | Stromgren et al. | 312/322 |
| 905,975 A | * | 12/1908 | Anderson | 211/76 |
| 953,457 A | * | 3/1910 | Brinker | 312/322 |
| 954,805 A | * | 4/1910 | Hitchcock | 312/9.7 |
| 1,581,749 A | * | 4/1926 | Mahony | 312/236 |
| 1,759,140 A | * | 5/1930 | Silberger | 211/77 |
| 1,864,039 A | * | 6/1932 | Brownson | 248/225.11 |
| 1,910,091 A | * | 5/1933 | Collier | 248/282.1 |
| 1,927,283 A | * | 9/1933 | Hernandez | 211/78 |
| 1,974,735 A | * | 9/1934 | Botham | 211/77 |
| 2,074,564 A | * | 3/1937 | Scurlock | 211/77 |
| 2,121,711 A | * | 6/1938 | Patts | 211/77 |
| 2,235,660 A | * | 3/1941 | Wiepert | 108/143 |
| 2,431,837 A | * | 12/1947 | Spotts et al. | 211/77 |
| 2,436,289 A | * | 2/1948 | Carlson | 211/77 |
| 2,512,502 A | * | 6/1950 | Paschell | 312/334.23 |
| 2,662,644 A | * | 12/1953 | Alexander | 211/77 |
| 2,754,166 A | * | 7/1956 | Ohm | 312/140.4 |
| 2,925,915 A | * | 2/1960 | Weitermann | 211/66 |
| 3,805,965 A | * | 4/1974 | Champagne | 211/77 |
| 4,334,623 A | * | 6/1982 | Geary | 211/85.29 |
| 5,244,272 A | * | 9/1993 | Thompson | 312/334.23 |
| 6,585,119 B2 | * | 7/2003 | Palder | 211/49.1 |
| 8,292,096 B2 | * | 10/2012 | Thompson | 211/77 |
| 2009/0255883 A1 | * | 10/2009 | Boyd et al. | 211/70 |
| 2010/0089848 A1 | * | 4/2010 | Thompson | 211/77 |

* cited by examiner

*Primary Examiner* — Joshua Rodden

(57) ABSTRACT

A storage system includes a track supported by a base that mounts onto a downwardly facing side of a horizontal shelf. An axle is slidable along the track, and a wheel is rotatably connected to the track via the axle. The wheel defines a plurality of circumferentially spaced C-clips that releasably snap about cylindrical containers.

20 Claims, 13 Drawing Sheets

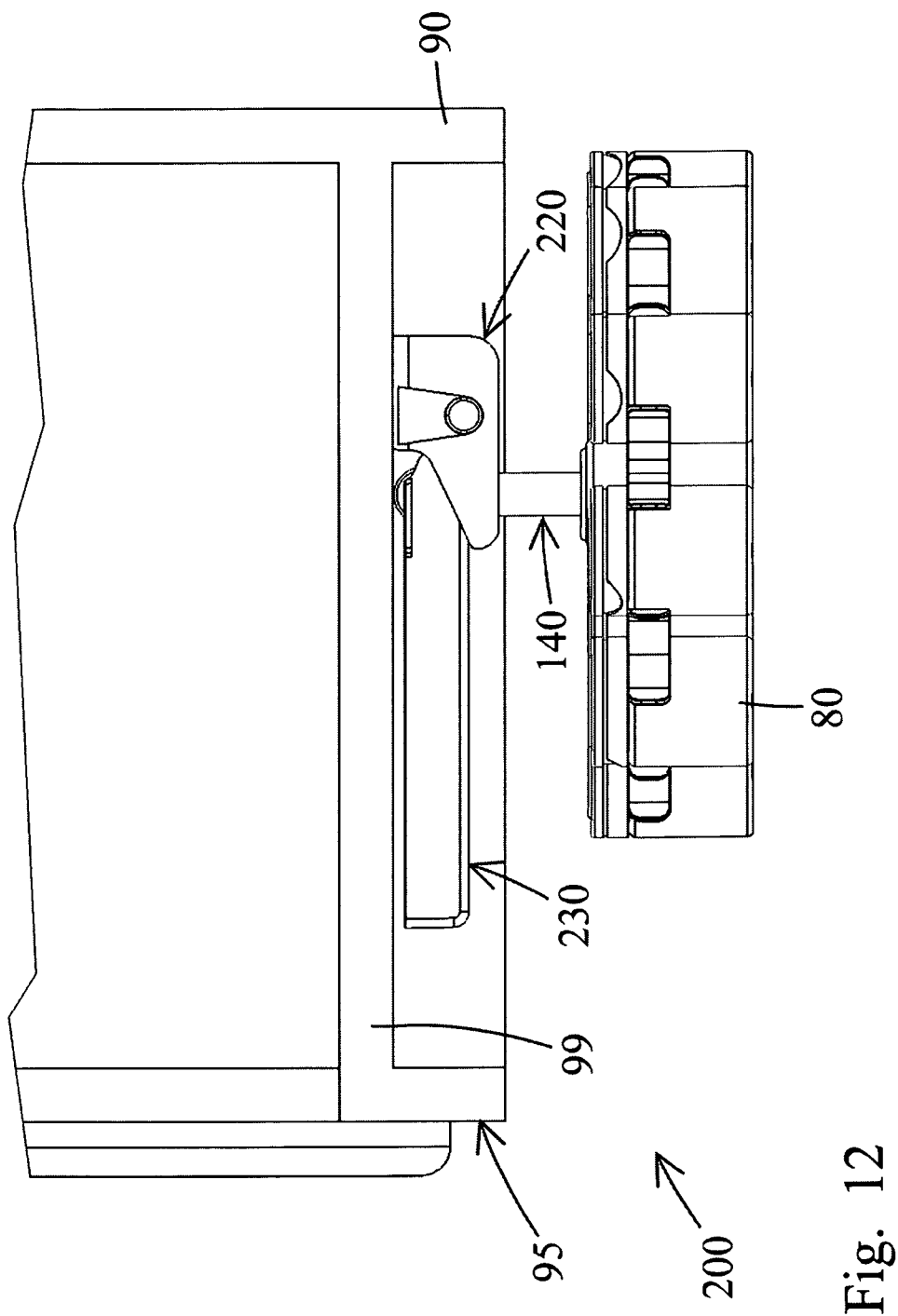

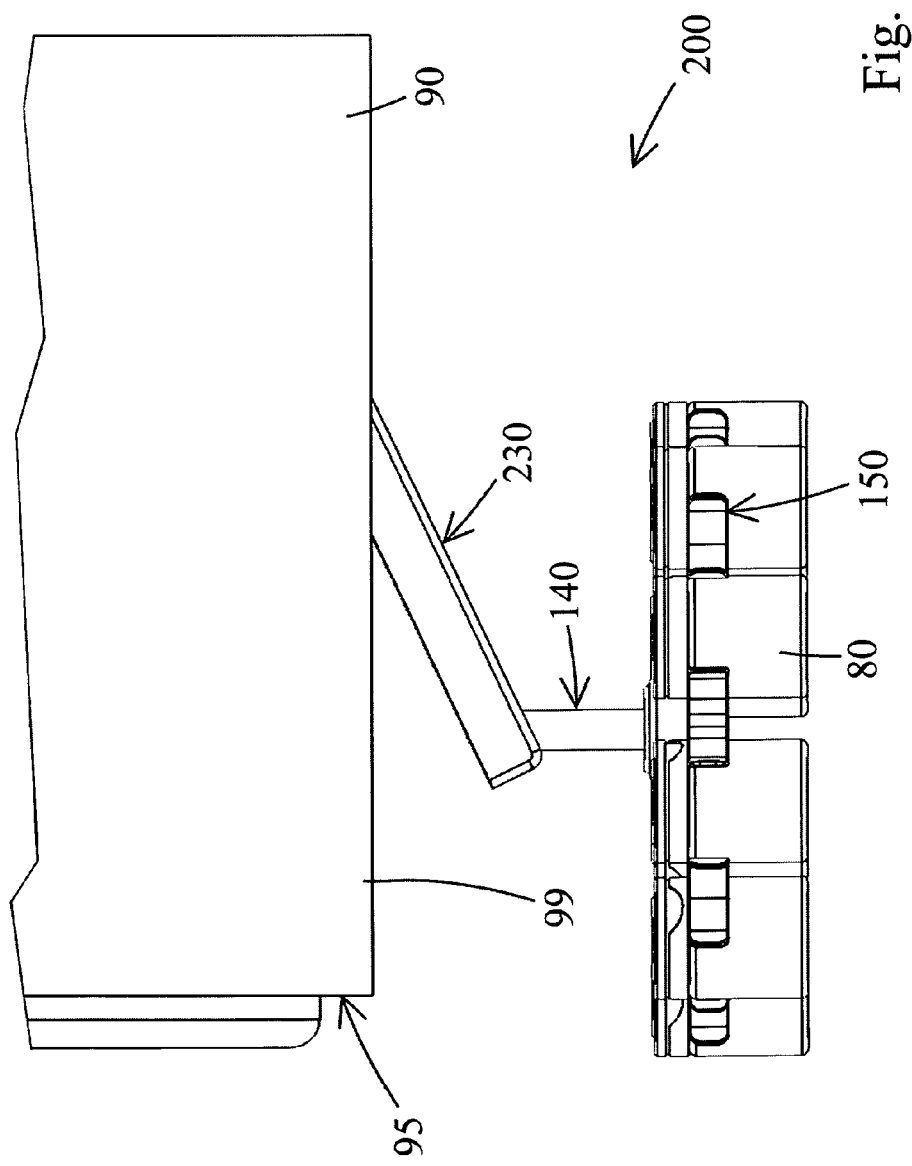

US 8,887,930 B1

ORGANIZATIONAL STORAGE SYSTEM

CROSS-REFERENCE TO RELATED APPLICATION

Disclosed herein is subject matter that is entitled to the filing date of U.S. Provisional Application No. 61/575,608, filed Aug. 24, 2011.

FIELD OF THE INVENTION

The present invention relates to methods and apparatus for storing items in organized fashion, and in a preferred application, to the storage of kitchen spice jars.

BACKGROUND OF THE INVENTION

Past efforts have led to various inventions directed toward the storage of household items, including, for example, kitchen spice jars. Despite various advances in the art, room for continued improvement remains. An object of the present invention is to provide a new and useful storage system.

SUMMARY OF THE INVENTION

The present invention provides a storage carousel that mounts beneath a cabinet or horizontal shelf. The carousel rotates to provide equal access to each of a plurality of jars releasably secured about its circumference. On one embodiment, the carousel also slides between a stowed location, wherein the carousel is disposed entirely rearward of a forward edge of the shelf, and a more accessible location, wherein at least part of the carousel is disposed forward of the forward edge of the shelf. On another embodiment, the carousel also moves vertically between a relatively higher stowed location, and a relatively lower and more accessible location. Many features and/or advantages of the present invention will become apparent from the more detailed description that follows.

BRIEF DESCRIPTION OF THE FIGURES OF THE DRAWING

With reference to the Figures of the Drawing, wherein like numerals represent like parts and assemblies throughout the several views.

FIG. 12 is a side view of the storage system components of FIG. 10 secured to the bottom side of a wall cabinet (having a side panel removed), and occupying a stowed configuration relative to the cabinet; and FIG. 13 is a side view of the storage system components of FIG. 10 secured to the bottom side of a wall cabinet, and occupying a more accessible configuration relative to the cabinet.

DETAILED DESCRIPTION OF A PREFERRED EMBODIMENT

Figure 1:
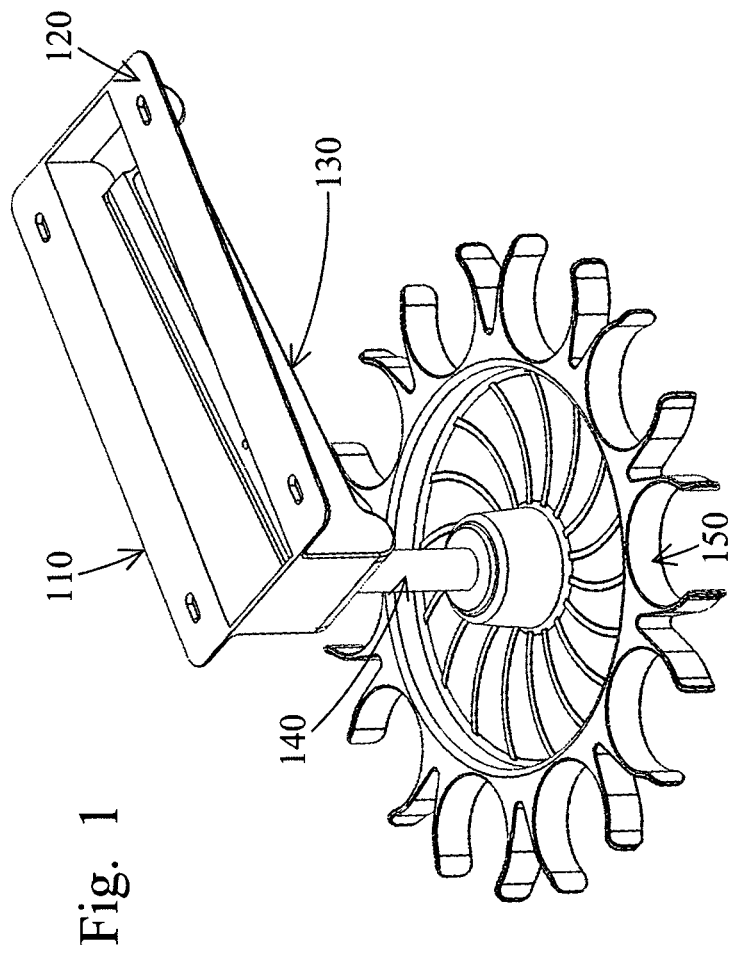
FIG. 1 is a perspective view of components of a first storage system constructed according to the principles of the present invention.
Figure 2:
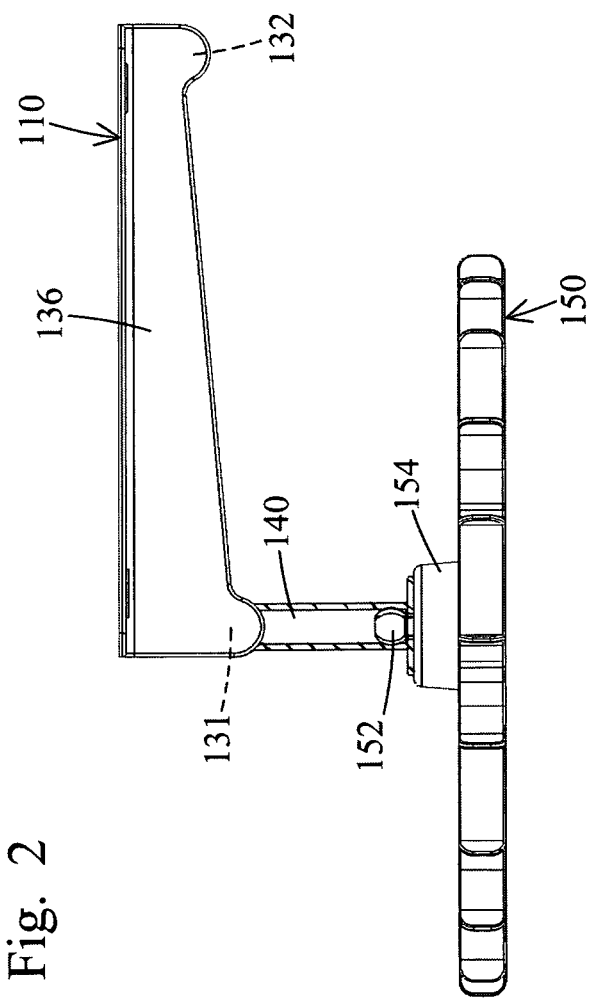
FIG. 2 is a partially sectioned side view of the storage system components of FIG. 1.

FIGS. 1-4 show components of a first storage system constructed according to the principles of the present invention. The depicted components include a bracket 110 having a first portion that defines a base 120 and a second portion that defines a track 130; an axle 140; and a carousel or wheel 150. Each of these three components is preferably a separate, injected molded plastic part that is manufactured using a relatively simple two-piece mold and a single direction of pull. However, persons skilled in the art will recognize that the axle and carousel components may be integrally formed as a unitary part, with some modifications, on alternative embodiments of the subject invention.

The base portion 120 of the bracket 110 includes opposite left and right flanges 121 and 122 having respective top and bottom surfaces that are bounded by common first and second parallel planes. In other words, the top surfaces of the flanges 121 and 122 are configured and arranged to rest flush against a flat surface, such as the downwardly facing side of a horizontal board. The depicted left flange 121 extends along the entire length of the left side of the bracket 110, and the depicted right flange extends along the entire length of the right side of the bracket 110. Holes 129 extend through respective flanges 121 and 122 near each of the four corners of the bracket 110 to accommodate insertion of the shafts of fasteners, such as conventional wood screws, for example, but resist passage of the heads of those fasteners. In other words, conventional wood screws (not shown) may be inserted into the holes 129 from the bottom side of flanges 121 and 122 and then threaded into an overlying board in order to rigidly secure the bracket 110 to the board. Persons skilled in the art will recognize that alternative known fastening means, including adhesive tape, for example, may be used in lieu of and/or in addition to wood screws for purposes of fastening the flanges 121 and 122 to an overlying board. Moreover, persons skilled in the art will recognize that alternative base arrangements may be used in lieu of and/or in addition to the flanges 121 and 122 in order to accommodate various types of known fastening means for purposes of fastening alternative embodiment brackets to an overlying board.

Figure 3:
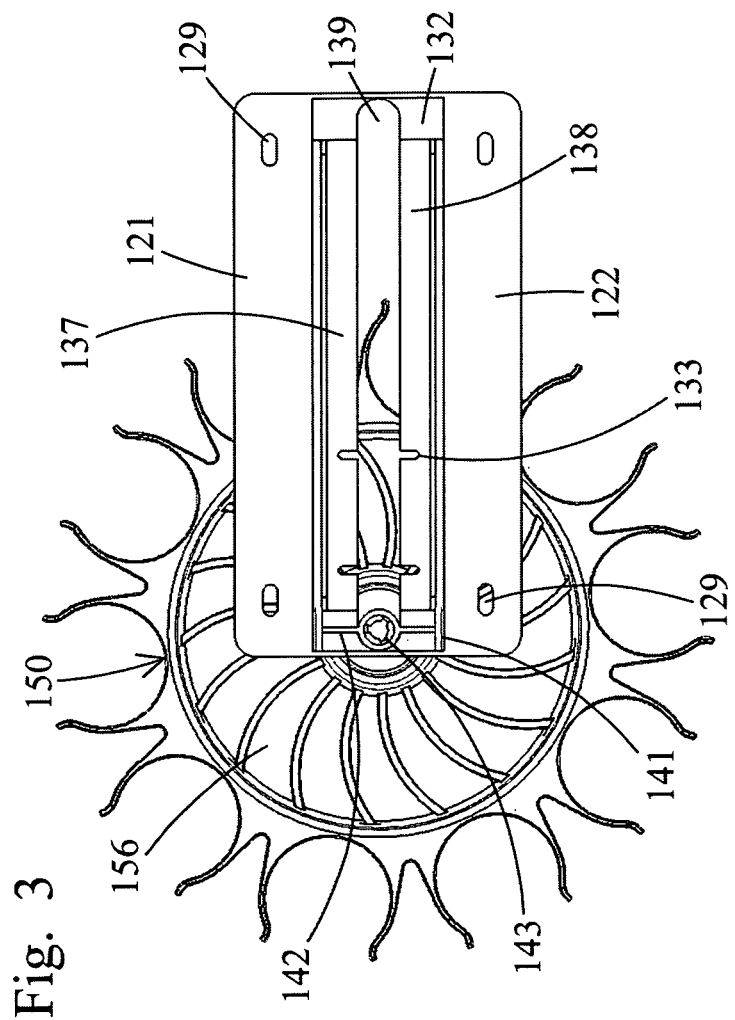
FIG. 3 is a top view of the storage system components of FIG. 1.
Figure 4:
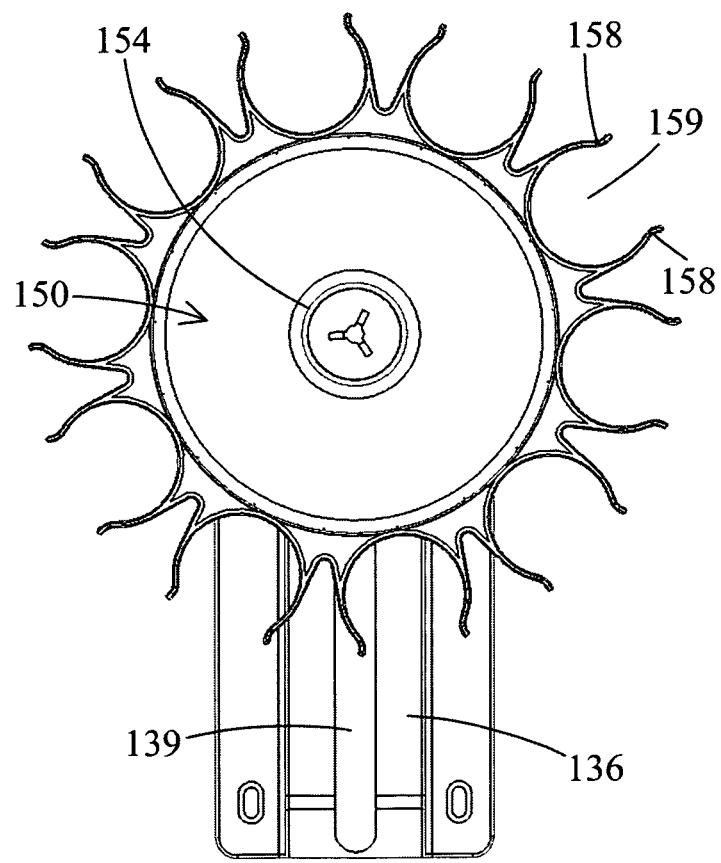
FIG. 4 is a bottom view of the storage system components of FIG. 1.

The track portion 130 of the bracket 110 is defined by a box-like structure or shell 136 that projects vertically downward from the flanges 121 and 122. As shown in FIG. 3, the bottom of the shell 136 is defined by parallel left and right rails 137 and 138 separated by an elongate slot 139 disposed therebetween and extending parallel thereto. The elongate slot 39 (or "path" 39) has a horizontally measurable component that is greater in length than a maximum radius defined by the wheel 150. The rails 137 and 138 and the slot 139 defined therebetween are inclined relative to the flanges 121 and 122. On the depicted embodiment, the angle of inclination is approximately five degrees, as can be measured in FIG. 2. With reference back to FIG. 3, first and second dips or recesses 131 and 132 are defined at opposite, first and second ends of the rails 137 and 138. As suggested in FIG. 2, the profile of each recess 131 and 132 is generally semi-circular. As shown in FIG. 3, the slot 139 extends into each recess 131 and 132 and then terminates proximate respective front and rear end walls of the shell 136. Also, two pairs of opposing notches 133 extend laterally into the opposing sides of the rails 131 and 132 for reasons further discussed below.

The axle 140 has a lower end sized and configured to rotatably interconnect with the carousel 150 (as further described below); an upper end 143 (see FIG. 3) sized and configured to travel along the track portion 130 of the bracket 110; and a generally cylindrical intermediate portion or tubular shaft extending therebetween. The intermediate portion of the axle 140 is sized and configured for insertion through the slot 139 and for passage along the slot 139.

As shown in FIG. 3, the upper end 143 of the axle 140 includes left and right tabs 142 that project radially outward from diametrically opposed sides of the central shaft. Left and right discs 141 are disposed on the distal ends of respective tabs 142 and extend orthogonally relative thereto. The distance between the discs 141 is equal to the distance between the notches 133 in the shell 136. As a result, prior to installation of the bracket 110, the upper end 143 of the axle 140 is rotated ninety degrees (relative to the orientation shown in FIG. 3) and then inserted upward through the slot 139 from a starting position beneath the rails 137 and 138. After sliding the upper end 143 toward the opposite end of the slot 139, the upper end 143 is rotated ninety degrees and nestled between the left and right sidewalls of the shell 136, with the left and right discs 141 resting on respective rails 137 and 138 and between opposite sidewalls of the shell 136 (as shown in FIG. 3).

Figure 5:
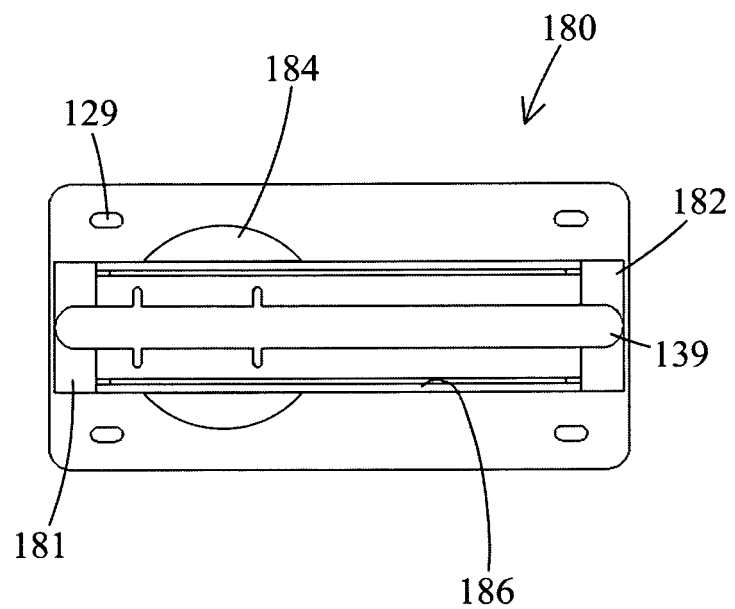
FIG. 5 is a top view of an alternative embodiment bracket that may be substituted for one of the storage system components of FIG. 1.

Persons skilled in the art will recognize that various changes may be made to the upper end of the axle and/or the method in which it is installed relative to the bracket, without departing from the scope of the present invention. For example, FIG. 5 shows an alternative embodiment bracket 180 suitable for use together with an alternative embodiment axle (not shown). The alternative embodiment axle is identical to the axle 140 except that the tabs 142 and the discs 141 are replaced by left and rights bars having a squared U-shaped profile. The bars similarly project radially outward from diametrically opposed sides of the central shaft. When properly oriented, the bars are sized and configured to slide upward through the slot 139 from a starting position beneath the rails 137 and 138 on the modified bracket 180.

The alternative embodiment bracket 180 is identical to the bracket 110 except as noted herein. Diametrically opposed sections of a cylindrical well or recess 184 project downward through an upper portion of the shell 186 of the bracket 180 to accommodate rotation of the modified axle after the bars are inserted through the slot 139. On this alternative embodiment, the bars may be inserted through the slot 139 before or after installation of the bracket 180. In other words, on this alternative embodiment, the axle and associated carousel may be selectively removed from the installed bracket 180 (by pushing upward on the carousel and axle; locating the bars within the well segments 184; rotating the components ninety degrees, and guiding the bars downward through the slot 139).

As on the bracket 100, the ends of the track defined by the alternative embodiment bracket 180 terminate in dips or recesses 181 and 182. However, as suggested by the distinct reference numerals, the recesses 181 and 182 have a square profile to accommodate the squared profile of the U-shaped bars on the alternative embodiment axle (rather than the semicircular profile of the recesses 131 and 132 on the bracket 110). As a result, the alternative embodiment axle is braced against pivoting relative to the bracket 180, whereas the axle 140 is capable of pivoting about a horizontal axis relative to the bracket 100.

The carousel 150 includes a centrally located hub 154; a donut-shaped tray 156 projecting radially outward from all sides of the hub 154; and ten circumferentially spaced pairs of opposing leaf springs 158 projecting outward from the circumference of the tray 156. The tray 156 is reinforced by arcuate, circumferentially distributed ribs that extend from the hub 154 to a rimmed outer edge of the tray 156. As shown in FIGS. 6-9, the tray 156 is sized and configured to accommodate a circular array of six conventional spice jars 80.

The hub 154 is a downwardly opening, generally cylindrical shell. Leaf springs 152 (see FIG. 2) extend upward from the top of the hub 154 and snap fit through a relatively narrower diameter hole in the lower end of the axle 140 to rotatable connect the carousel 150 to the axle 140. Persons skilled in the art will recognize that other arrangements may be made for connecting the carousel 150 to the axle 140. For example, leaf springs may be provided on the lower end of the axle and snap fit through a relative smaller diameter opening in the hub, in which case the ends of the leaf springs may be have catches that engage an edge on the hub to discourage inward deflection of the leaf springs in response to downward force on the carousel. Various alternative embodiment leaf springs on the axle may insert axially through an opening in the top of the hub, or radially through an opening in a sidewall of the hub. On another alternative embodiment, a conventional threaded nut may be press-fit into the lower end 140 of the axle, and a conventional bolt may be inserted upward through the bottom of the hub and threaded into the nut (with a stand-off to prevent clamping of the carousel to the axle). On yet another alternative embodiment, a conventional bolt may extend through the hub and a majority of the axle, and thread into a conventional nut keyed into the top of the axle.

Each pair of leaf springs 158 defines a resilient, C-shaped spring clip or receptacle 159 that opens radially outward from the hub 154. As shown in FIGS. 6-9, ten of the receptacles 159 are configured and arranged to accommodate a circular array of ten conventional spice jars 80 distributed about the circumference of the tray 156. Among other things, upwardly opening bins or cups may be designed to snap into the receptacles 159 in lieu of one or more of the spice jars 80. Persons skilled in the art will also recognize that alternative embodiments of the subject invention may be provided with other sorts of receptacles for the spice jars 80 or for other containers. For example, leaf spring clips may be arranged to act upon relatively more elongate containers that extend horizontally rather than vertically. On still other alternative embodiments, the receptacles may be configured as cups having sidewalls and a bottom wall, as opposed to leaf springs.

FIGS. 6-9 show the components of FIGS. 1-4 installed beneath an otherwise conventional kitchen cabinet 90 to define an installed storage system 100. The cabinet 90 includes a bottom shelf or board 99 (see FIG. 11) that extends horizontally across the bottom of the cabinet 90, and is bounded by first and second horizontal planes. Conventional wood screws (not shown) are inserted through the holes 129 in the bracket 110, and threaded into the bottom of the board 99, to fasten the bracket 110 to the bottom side of the board 99. FIGS. 6-9 also show sixteen otherwise conventional spice jars 80 loaded onto the carousel. Each spice jar 80 is a plastic, upwardly opening cylinder and is capped with a screw-on lid 88. Persons skilled in the art will recognize that the spice jars may be made of different materials and/or in various sizes without departing from the scope of the present invention. Moreover, similar containers may be used to hold various types of contents, including, for example, beads, hardware, office supplies, and pills.

Provisions also may be made to accommodate containers of various diameters. For example, secondary leaf springs may be incorporated into the existing leaf springs to define a smaller gap therebetween. A smaller diameter jar would snap into engagement with the secondary leaf springs. A larger diameter jar would deflect the secondary leaf springs and snap into engagement with the primary leaf springs (without unduly straining the second leaf springs because they would deflect together with the primary leaf springs). Another possibility is to fit the existing leaf springs with add-on pads that reduce the gap therebetween and/or to fit the smaller diameter jars with collars or rings that enlarge the effective diameter of the jars.

Figure 6:
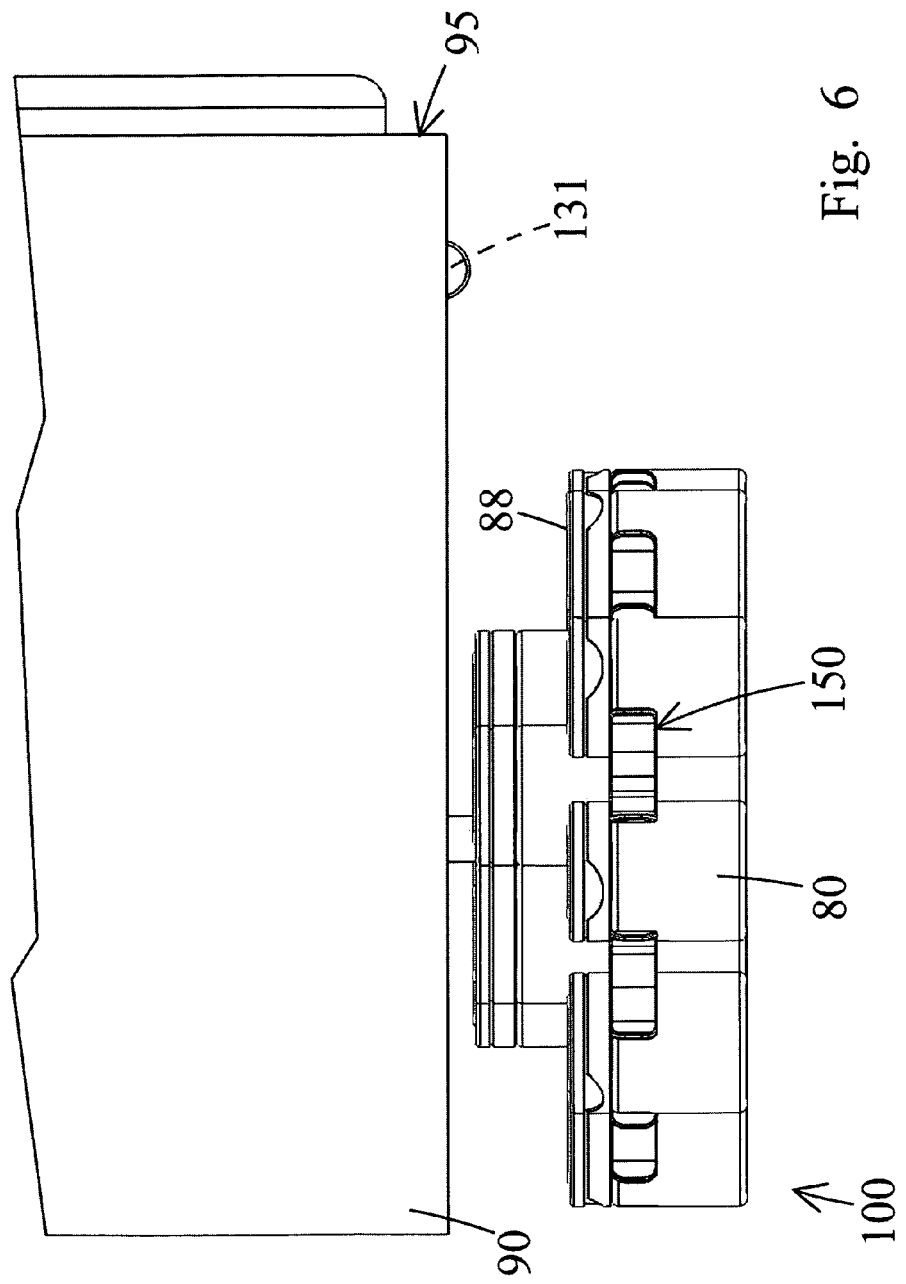
FIG. 6 is a side view of the storage system components of FIG. 1 laden with kitchen spice jars, secured to the bottom side of a wall cabinet, and occupying a stowed configuration relative to the cabinet.
Figure 7:
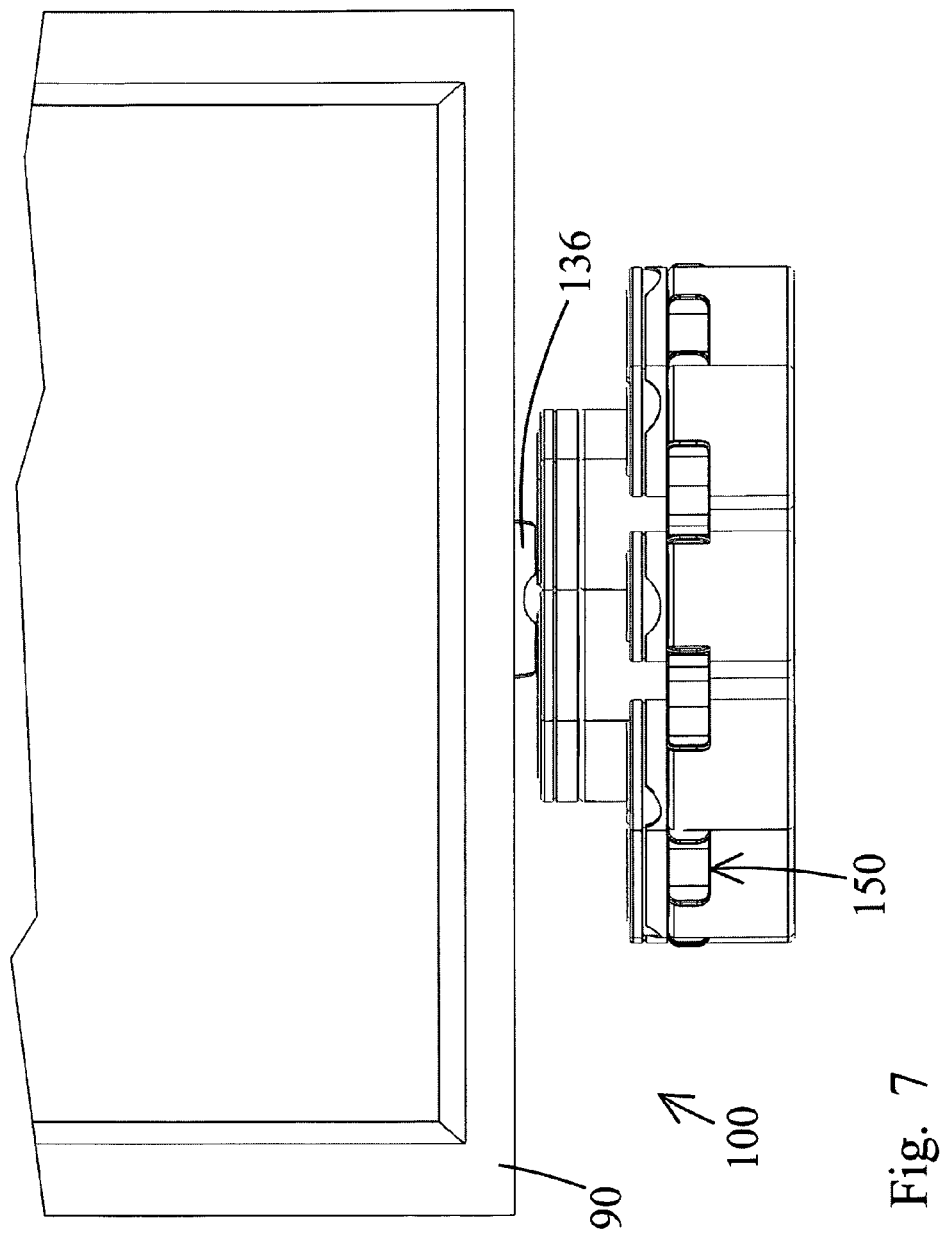
FIG. 7 is a front view of the laden and stowed storage system of FIG. 6.
Figure 8:
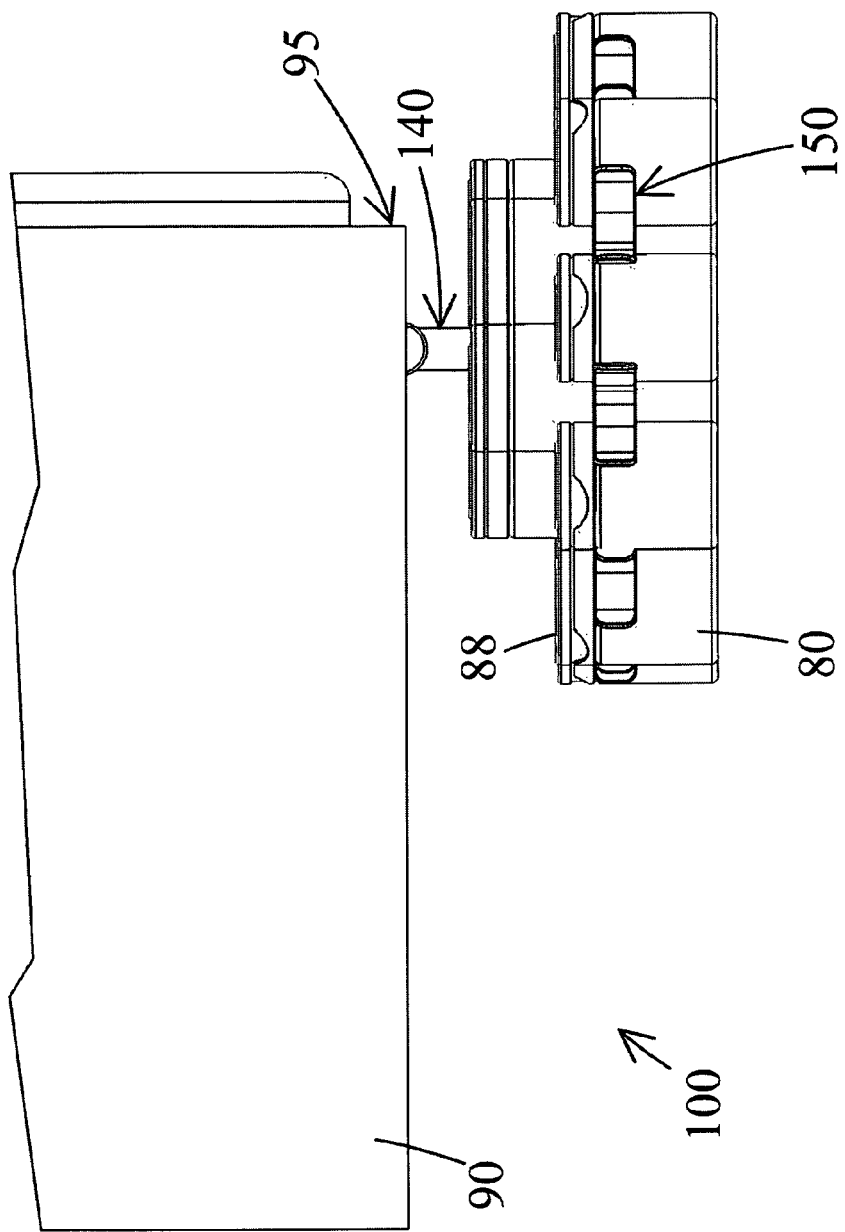
FIG. 8 is a side view of the storage system components of FIG. 1 laden with kitchen spice jars, secured to the bottom side of a wall cabinet, and occupying a more accessible configuration relative to the cabinet.
Figure 9:
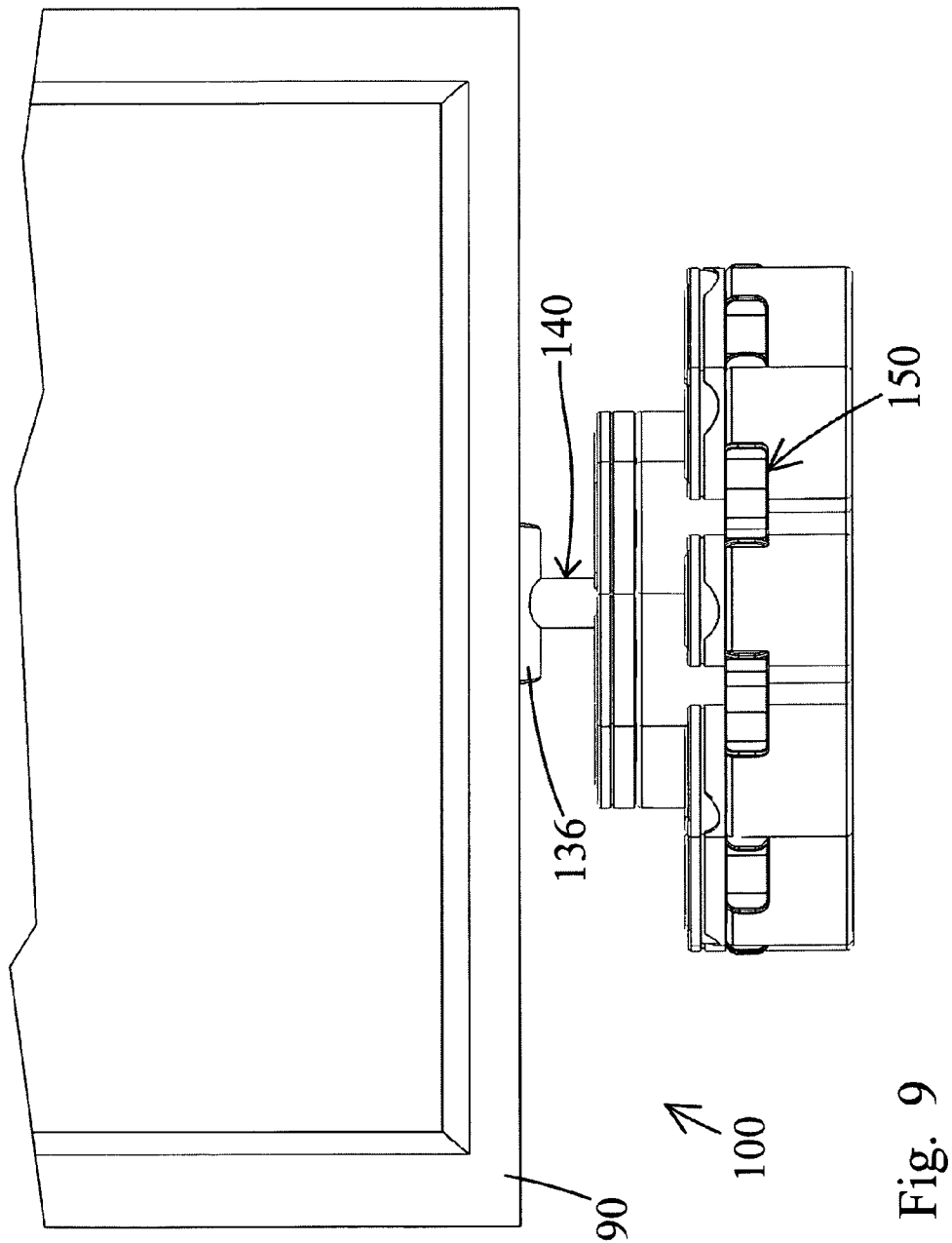
FIG. 9 is a front view of the laden and more accessible storage system of FIG. 8.

FIGS. 6-7 show the carousel 150 occupying a stowed position relative to the cabinet 90, with the axle 140 occupying the rear recess 132 along the track, and the entire carousel 150 disposed rearward of the front edge 95 of the cabinet 90. FIGS. 8-9 show the carousel 150 occupying a deployed or more accessible position relative to the cabinet 90, with the axle 140 occupying the front recess 131 along the track, and a portion of the carousel 150 disposed forward of the front edge 95 of the cabinet 90. Also, the carousel 150 is disposed a first vertical distance beneath the cabinet 90 in FIGS. 6-7, and the carousel occupies a relatively greater, second distance beneath the cabinet 90 in FIGS. 8-9. Depending on various factors including cabinet design, installation parameters, and spice jar sizes, this change in elevation may allow the tops of the spice jars to move between a rearward position upward and behind the front edge of the cabinet and a forward position downward and below the front edge of the cabinet.

Figure 10:
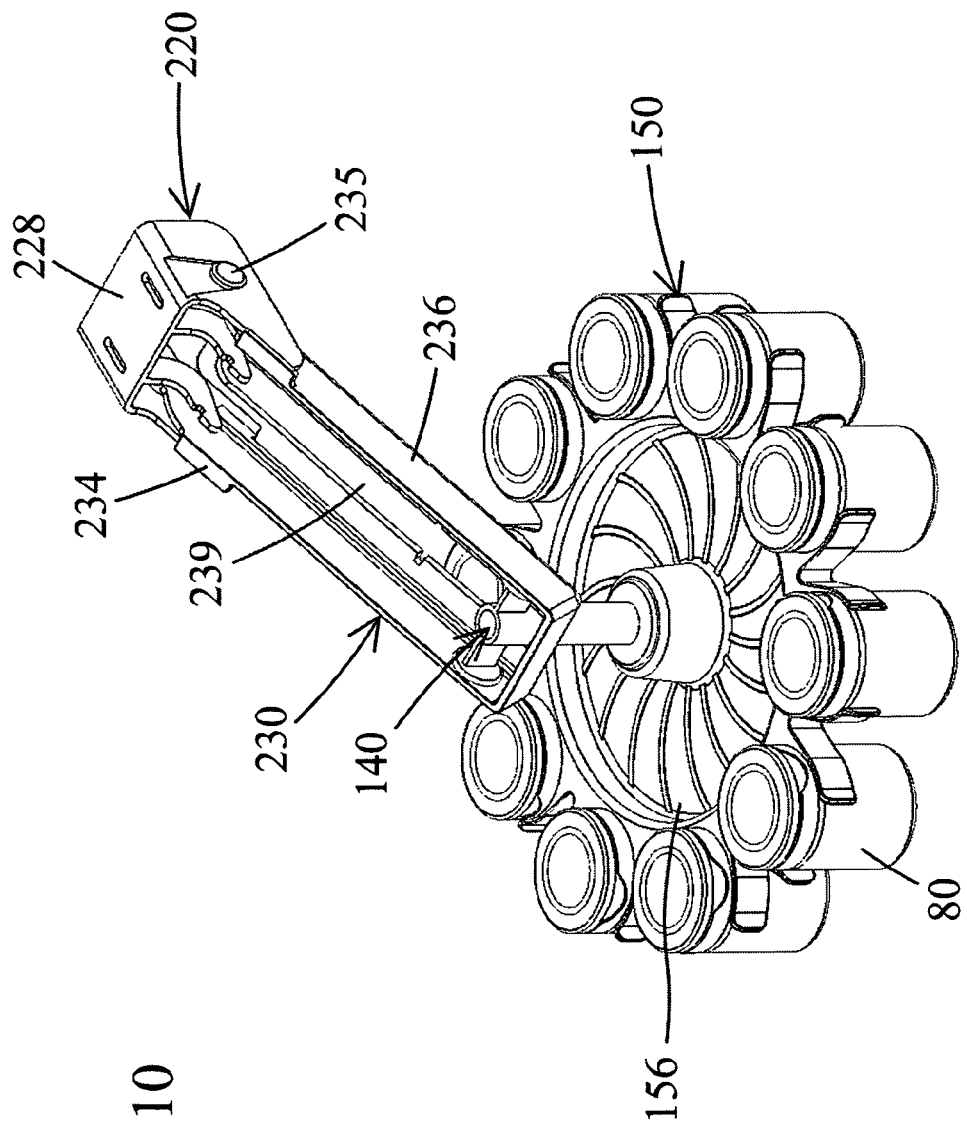
FIG. 10 is a perspective view of components of a second storage system constructed according to the principles of the present invention and laden with spice jars.
Figure 11:
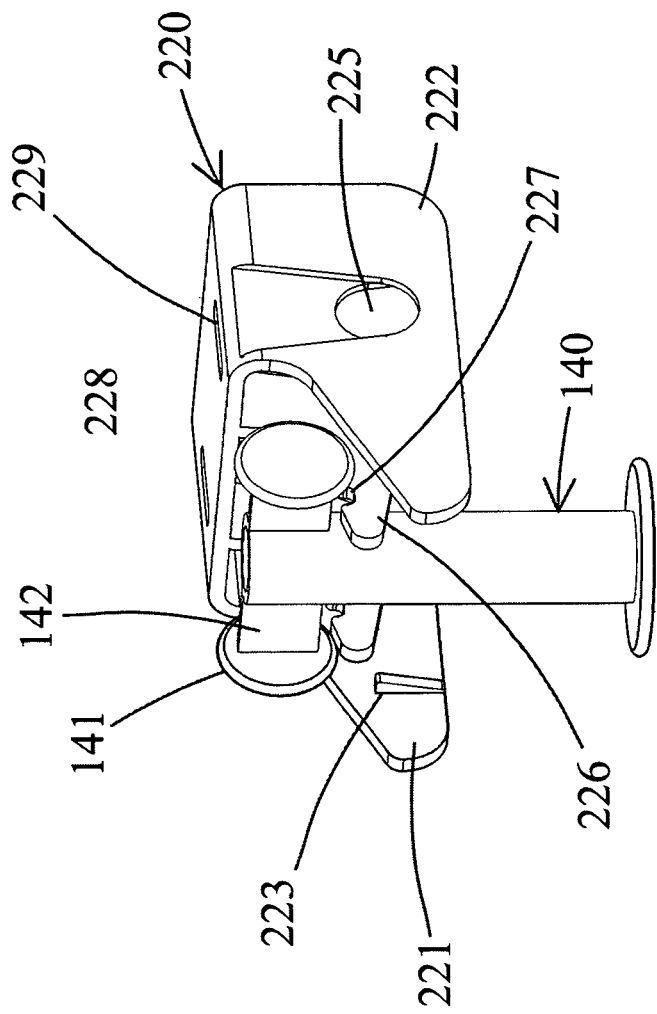
FIG. 11 is another perspective view of two of the components shown in FIG. 10.

FIGS. 10-11 show components of a second storage system constructed according to the principles of the present invention, and laden with some of the same spice jars 80. The central tray 156 is left vacant to emphasize that items other than jars may be stored in this space. As suggested by the common reference numerals the carousel 150 and the axle 140 are the same as those shown in FIGS. 1-4. However, the bracket 110 has been replaced with an alternative embodiment bracket having a first portion that defines a base 220 and a second portion that defines a track 230. Each of the bracket components 220 and 230 is preferably a separate, injected molded plastic part that is manufactured using a relatively simple two-piece mold and a single direction of pull.

The base portion 220 includes a top wall 228 having respective top and bottom surfaces that are bounded by common first and second parallel planes. In other words, the top surface of the top wall 228 are configured and arranged to rest flush against a flat surface, such as the downwardly facing side of a horizontal board. Holes 229 extend through opposite end portions of the top wall 228 to accommodate insertion of the shafts of fasteners, such as conventional wood screws, for example, but resist passage of the heads of those fasteners. In other words, conventional wood screws (not shown) may be inserted into the holes 229 from the bottom side of the top wall 228 and then threaded into an overlying board in order to rigidly secure the base portion 220 to the board.

The base portion also includes opposing left and right sidewalls 221 and 222 that extend perpendicularly downward from respective ends of the top wall 228. Aligned circular holes 225 extend through respective sidewalls 221 and 222. Relatively lower portions of the sidewalls 221 and 222 extend forward beyond a forward edge of the top wall 228 and function as leaf springs, and opposing, upwardly expanding, wedge-shaped tabs 223 are disposed on forward portions of the leaf springs. Also, opposing left and right flanges 226 project downward from respective intermediate portions of the top wall 228 and then forward beyond a forward edge of the top wall 228, and upwardly opening notches 227 extend downward into the forward portions of respective flanges 226. As shown in FIG. 11, the tabs 142 on the axle 140 are moveable to a position in overlying vertical alignment with the notches 227. As a result, the axle 140 (together with the carousel 150) can be selectively retained in place on the flanges 226, and suspended therefrom (independent of the track portion 230).

The track portion 230 is defined by a chute-like structure or shell 236. Proximate the rearward end of the shell 236, left and right tabs project rearward and function as leaf springs. Cylindrical nubs or buttons 235 project outward from outboard sides of respective tabs on the shell 236 and snap into respective holes 225 in the base portion 220. The nubs 235 cooperate with the holes 225 to pivotally connect the track portion 230 to the base portion 220 for pivoting about a horizontal axis.

Proximate the rearward end of the shell 236, left and right flanges 234 project laterally outward from respective sidewalls of the shell 236. These flanges 234 rest on top of respective sidewalls 221 and 222 of the base portion 220 when the track portion 230 is pivoted twenty-five degrees from horizontal relative to the base portion 220. In other words, the sidewalls 221 and 222 supported the weight of the track portion 230, the axle 140, and the carousel 150 when the track portion 230 is pivoted downward twenty-five degrees out of parallel with the top wall 228. When the track portion 230 is pivoted into a parallel orientation relative to the top wall 228 (and horizontal), portions of the shell 236 encounter the tabs 223 on the base portion 220, cause the sidewalls 221 and 222 to spread apart, and then bottom portions of the shell 236 clear the tabs 223 and come to rest on the tabs 223 as the sidewalls 221 and 222 flex back toward one another.

The bottom of the shell 236 is defined by parallel left and right rails separated by an elongate slot 239 disposed therebetween and extending parallel thereto. The slot 239 and the rails function in much the same manner as those on the track portion 130 described with reference to FIGS. 1-4, except that there are no dips at the ends of the track defined thereby. Also, similar pairs of opposing notches 133 extend laterally into opposing, inwardly facing sides of the rails. Because of the pivoting track portion 230, the notches 133 allow the axle 140 to be installed and removed relative to the track portion 230 regardless of whether or not the base portion 220 is installed.

FIGS. 12-13 show the components of FIGS. 10-11 installed beneath an otherwise conventional kitchen cabinet 90 to define an installed storage system 200. The cabinet 90 includes a bottom shelf or board 99 that extends horizontally across the bottom of the cabinet 90, and is bounded by first and second horizontal planes. The depth of the cabinet 90 is approximately one foot. Conventional wood screws (not shown) are inserted through the holes 229 in the base portion 220, and threaded into the bottom of the board 99, to fasten the bracket 220 to the bottom side of the board 99. Persons skilled in the art will recognize that the base portion 220 may alternatively be installed beneath an upper shelf disposed inside the cabinet 90, or beneath a simple horizontal shelf not associated with any cabinetry, for example.

FIG. 12 shows the track portion 230 and the carousel 150 occupying a stowed position relative to the cabinet 90, with the track portion 230 extending parallel to the board 99 and the top wall 228 on the base portion 220, and the entire carousel 150 disposed rearward of the front edge 95 of the cabinet 90. FIG. 13 shows the track portion 230 and the carousel 150 occupying a deployed or more accessible position relative to the cabinet 90, with the track portion 230 tilted twenty-five degrees relative to the board 99 and the top wall 228 of the base portion 220, and a portion of the carousel 150 disposed forward of the front edge 95 of the cabinet 90. Also, the carousel 150 is disposed a first vertical distance beneath the cabinet 90 in FIG. 12, and the carousel occupies a relatively greater, second distance beneath the cabinet 90 in FIG. 13 (and the vertical travel is many times greater than that achieved by the components shown in FIGS. 1-4). Depending on various factors including cabinet design, installation parameters, and spice jar sizes, this change in elevation may allow the tops of the spice jars to move between a rearward position upward and behind the front edge of the cabinet and a forward position downward and below the front edge of the cabinet.

Different sorts of track defining arrangements may be used without departing from the scope of the subject invention. For example, the track portion may define a single beam or monorail having an I-shaped or inverted T-shaped profile, in which case a C-shaped traveler may be mounted on top of the axle to travel along the lower portion thereof. Alternatively, the track portion may define a single beam or mono-rail having a J-shaped profile, in which case an inverted J-shaped traveler may be mounted on top of the axle to travel along the lower portion thereof. An advantage of slotted tracks is that they can be configured to accommodate rotation of an alternative embodiment axle relative thereto. For example, an alternative embodiment slotted track may terminate in a forward end that defines an upwardly opening cylindrical recess, and an alternative embodiment axle may have a top end configured as a vertically oriented cylinder that drops into the recess and rotates therein. Of course, persons skilled in the art will also recognize that the monorail embodiments discussed above can accommodate a two-part axle having an upper portion and a lower portion that are rotatably interconnected to one another. In other words, rotation of the carousel relative to the track may be accomplished in various ways, including rotatably connecting the carousel to the axle, rotatably connecting the axle to the track, and/or dividing the axle into upper and lower sections that rotate relative to one another.

The present invention has been described with reference to particular embodiments and specific applications. However, this disclosure will enable persons skilled in the art to derive additional modifications, improvements, and/or applications that nonetheless embody the essence of the invention. For example, persons skilled in the art will recognize that features of the many embodiments shown and/or described herein may be interchanged with features on other embodiments, as well as mixed and matched in various combinations, to arrive at still more embodiments of the present invention. In view of the foregoing, the scope of the present invention is to be limited only to the extent of the following claims.

What is claimed is:

1. A storage system, comprising:
   a storage shelf having a front edge, an upwardly facing side, and an opposite, downwardly facing side;
   a bracket mounted on the downwardly facing side of the storage shelf;
   a wheel that defines a plurality of circumferentially spaced receptacles configured and arranged to receive and retain cylindrical containers; and
   an axle interconnected vertically between the wheel and the bracket, wherein the axle is rotatably connected to at least one of the wheel and the bracket to accommodate relative rotation therebetween, and wherein the axle is movably connected to the bracket for movement between a stowed position on the bracket, relatively further from the front edge, and a more accessible position on the bracket, relatively nearer to the front edge, and wherein a first vertical distance is defined between the wheel and the storage shelf when the axle occupies the stowed position, and a relatively greater, second vertical distance is defined between the wheel and the storage shelf when the axle occupies the more accessible position.

2. The storage system of claim 1, wherein the bracket defines a track for movement of the axle between the stowed position and the more accessible position.

3. The storage system of claim 1, further comprising a plurality of cylindrical kitchen spice jars, wherein the receptacles include pairs of opposing first and second leaf springs that cooperate to define radially outwardly opening C-clips configured and arranged to releasably snap about the spice jars.

4. The storage system of claim 1, wherein the bracket comprises a base portion and a pivoting portion pivotally connected to the base portion, and the base portion is mounted on the downwardly facing side of the storage shelf, and the axle is movable along the pivoting portion.

5. A storage system, comprising:
   a bracket including a track supported by a base configured and arranged for mounting onto a downwardly facing side of a flat horizontal board;
   a wheel defining a plurality of circumferentially spaced pairs of opposing first and second leaf springs that cooperate to define outwardly opening C-clip receptacles configured and arranged to releasably snap about respective kitchen spice jars; and
   an axle movably connected to the track for movement along the track, wherein the axle is rotatably connected to at least one of the wheel and the track to accommodate rotation of the wheel relative to the bracket, wherein the storage system is configured and arranged such that when the base is mounted to the downwardly facing side, a first vertical distance is defined between the wheel and the base when the axle occupies a rearward end of the track, and a relatively greater, second distance is defined between the wheel and the base when the axle occupies an opposite, forward end of the track.

6. The storage system of claim 5, further comprising a flat horizontal storage shelf having a front edge, wherein the base is mounted onto a downwardly facing side of the storage shelf with the track extending perpendicular to the front edge, and all of the wheel is disposed rearward of the front edge when the axle occupies the rearward end of the track, and at least a portion of the wheel is disposed forward of the front edge when the axle occupies the opposite, forward end of the track.

7. The storage system of claim 5, wherein the rearward end of the track is pivotally connected to the base for pivoting about a horizontal axis that extends perpendicular to the track.

8. The storage system of claim 5, wherein the track is configured and arranged to bias the axle against moving from one said end of the track toward an opposite said end.

9. The storage system of claim 5, wherein the wheel is rotatable about the axle, and the axle is slidable along the track.

10. The storage system of claim 5, further comprising a plurality of cylindrical kitchen spice jars, wherein the spice jars occupy respective said receptacles.

11. A storage system, comprising:
a shelf having a front edge and a downwardly facing side;
a bracket including a track supported by a base, wherein the base is mounted onto the downwardly facing side of the shelf; and
a wheel defining pairs of opposing members configured and arranged to receive and retain respective containers, wherein the wheel is movably connected to the track for both rotation relative to the track and translation along the track, and wherein the track has a first end, an opposite second end, and at least one obstacle disposed therebetween to discourage movement of the wheel away from the second end and toward the first end, and all of the wheel is disposed rearward of the front edge when the wheel is disposed at the first end of the track, and at least a portion of the wheel is disposed forward of the front edge when the wheel is disposed at the second end of the track.

12. The storage system of claim 11, wherein the first end is disposed a first distance beneath the downwardly facing side of the shelf, and the second end is disposed a relatively greater, second distance beneath the downwardly facing side of the shelf, and the obstacle comprises a step in the track between the first end and the second end.

13. A storage system, comprising:
a shelf having a front edge and a downwardly facing side;
a bracket including a base mounted onto the downwardly facing side of the shelf;
a wheel movably connected to the bracket for both rotation and translation relative to the base; and
a plurality of containers mounted on the wheel at respective circumferentially spaced locations about a peripheral portion of the wheel, wherein (a) when the wheel is moved to a rearwardmost location relative to the base, all of the containers are disposed rearward of the front edge, and (b) when the wheel is moved to an opposite, forwardmost location relative to the base, (i) at least a portion of one of the containers is disposed forward of the front edge; and (ii) at least a portion of one of the containers remains rearward of the front edge.

14. The storage system of claim 13, wherein the containers clip into and out of respective said locations on the wheel.

15. A storage system, comprising:
a bracket including a base configured and arranged for mounting onto a downwardly facing flat surface;
a wheel;
a plurality of storage containers mounted on the wheel at respective circumferentially spaced locations about a peripheral portion of the wheel; and
an axle movably connected to the bracket for translational movement along a prescribed path having a forward end and an opposite, rearward end, wherein the axle is interconnected between the wheel and the bracket in a manner that supports the wheel beneath the base and accommodates rotation of the wheel relative to the base, and when the axle occupies the forward end of the path, rotational movement of the wheel relative to the base sequentially moves each of the containers to a forwardmost position relative to the base; wherein the path has a horizontally measurable component that is greater in length than a maximum radius defined by the wheel.

16. The storage system of claim 15, wherein each of the containers is a kitchen spice jar having a lid that opens and closes to selectively provide access to contents disposed inside the jar, and each said spice jar occupies an upright orientation when rotated to said forwardmost position relative to the base.

17. The storage system of claim 15, wherein the containers clip into and out of respective said locations on the wheel.

18. The storage system of claim 15, further comprising a shelf that defines said downwardly facing flat surface, wherein the base is mounted on said downwardly facing flat surface, and the axle is disposed entirely underneath the shelf at each said end of the path.

19. The storage system of claim 15, wherein the axle is interconnected between the wheel and the bracket in a manner that also accommodates pivoting of the axle about a horizontal axis relative to the bracket.

20. The storage system of claim 15, wherein the wheel is rotatably mounted on the axle, and the axle is slidably mounted on the bracket.

* * * * *